United States Patent [19]
Ma et al.

[11] Patent Number: 5,702,836
[45] Date of Patent: Dec. 30, 1997

[54] ELECTROCATALYST

[75] Inventors: Chaoying Ma, Nutley, N.J.; Albert D. Kowalak, Cambridge, Mass.

[73] Assignee: University of Massachusetts, Boston, Mass.

[21] Appl. No.: 642,428

[22] Filed: May 3, 1996

[51] Int. Cl.[6] .............................. H01M 4/88; H01M 4/92
[52] U.S. Cl. .............................. 429/13; 429/44; 502/101; 502/326
[58] Field of Search ................................... 502/101, 326; 429/13, 44

[56] References Cited

U.S. PATENT DOCUMENTS

| | | | |
|---|---|---|---|
| 3,765,947 | 10/1973 | Felten et al. | 502/101 |
| 4,024,074 | 5/1977 | Cairati et al. | |
| 4,044,193 | 8/1977 | Petrow et al. | 429/40 |
| 4,136,059 | 1/1979 | Jalan et al. | 502/101 |
| 4,331,567 | 5/1982 | Canavesi et al. | |
| 5,009,872 | 4/1991 | Chuang et al. | 423/245.3 |
| 5,128,305 | 7/1992 | Yoshimoto et al. | 502/326 X |
| 5,453,169 | 9/1995 | Callstrom et al. | 204/242 |

FOREIGN PATENT DOCUMENTS

WO 92/16027  9/1992  WIPO.

OTHER PUBLICATIONS

Gorman et al., "Platinum–Catalyzed Oxidations of Organic Compounds by Ferric Sulfate: Use of a Redox Fuel Cell to Mediate Complete Oxidation of Ethylene Glycol by Dioxygen at 80° C.," *Journal of Catalysis*, 158:92–96, 1996 (Month Unknown).

Ma et al., "TEM Study of the Pt–Ru Bi–Metallic Catalyst Formation," *Mater. Res. Soc. Proc.*, 332:327–332, 1994 (Month Unknown).

Ma et al., "The Preparation and Characterization of PT/FE Bimetallic Electrocatalyst for Direct Methanol Oxidation in Fuel Cell," *Materials Research Society, 1994 Fall Meeting*, Abstract (Month Unknown).

Ma et al., "The Preparation and Characterization of PT/FE Bimetallic Electrocatalyst for Direct Methanol Oxidation in Fuel Cell," *Mater. Res. Soc. Proc.*, 368:145–150, 1995 (Published Jul. 1995).

Ohmori et al., "Electro-oxidation of methanol on Pt electrodes modified by metal oxides and noble metals," *Journal of Electroanalytical Chemistry*, 281:331–337, 1990 (Month Unknown).

Primary Examiner—Stephen Kalafut
Attorney, Agent, or Firm—Fish & Richardson P.C.

[57] ABSTRACT

A Pt/Fe/C electrocatalyst for, e.g., the oxidation of methanol in fuel cells, Pt/Fe colloidal particles and a method for preparing the Pt/Fe/C electrocatalyst are described.

23 Claims, 7 Drawing Sheets

CYCLIC VOLTAMMOGRAPH OF Pt/Fe/C CATALYST IN 0.1 M H2SO4 SOLUTION

ELECTROCATALYST

BACKGROUND OF THE INVENTION

The invention relates to electrocatalysts and methods for making electrocatalysts.

Many chemical reactions, while thermodynamically favorable, do not occur at useful rates without assistance. For such reactions to be useful, it is often necessary to find a homogeneous or heterogeneous catalyst that will increase the rate of reaction, often by several orders of magnitude. A particular type of catalyst known as an electrocatalyst provides low energy activation pathways that permit electricity-producing reactions to occur at a practical rate.

Electrocatalysts are useful for enhancing chemical reactions in fuel cells used, for example, as a source of energy for powering a vehicle. A fuel cell is an electrochemical device, with an anode-electrode and a cathode-electrode, that converts chemical energy provided by a fuel and an oxidant into electricity. The fuel is oxidized at the anode and gives up electrons to an external electrical load. The oxidant accepts electrons and is reduced at the cathode. Ionic current through an electrolyte completes the circuit. A chemical fuel such as hydrogen ($H_2$) or $CH_3OH$ can be fed to the cell as needed, so a fuel cell, unlike a battery, does not require recharging.

A fuel cell typically provides clean, non-polluting energy, producing as byproducts only water and other non-polluting materials. For example, in a typical methanol fuel cell, methanol is oxidized to produce electricity, heat, water, and carbon dioxide. Complete methanol oxidation to carbon dioxide for maximum energy generation, shown in equation (1) below, is the goal in fuel cell processing.

$$CH_3OH+H_2O \rightarrow CO_2+6H^++6e^- \quad (1)$$

In the absence of an electrocatalyst, a typical electrode reaction occurs, if at all, only at very high overpotentials. Electrocatalysts are important because the energy efficiency of any cell is determined, in part, by the overpotentials necessary at the cell's anode and cathode.

Platinum (Pt), an expensive material, has been used as an electrocatalyst material for methanol oxidation in fuel cells. In a low-cost acid electrolyte fuel cell with platinum as the electrocatalyst, it is desirable to optimize the chemical activity of the platinum, e.g., by maximizing the platinum's surface area by preparing electrochemically-active platinum particles that are highly dispersed, i.e., that have a high ratio of surface atoms to all atoms.

Platinum (IV) oxide colloidal particles have been generated from chloroplatinic acid ($H_2PtCl_6$) (see, e.g., Petrow et al., U.S. Pat. No. 4,044,193; Ma et al., Mater. Res. Soc. Proc., 332:327–332, (1994)). Hydrogen peroxide ($H_2O_2$) has been mixed with the chloroplatinic acid and sodium dithionite to improve the stability of the platinum-containing colloidal dispersion. To reduce platinum recrystallization and increase the activity of this catalyst, it was heated in an inert atmosphere or vacuum at a high temperature after porous carbon was deposited on and around the supported platinum crystallites. However, the activity and the long-term stability of even carbon-supported platinum electrodes are too low for practical use.

Ruthenium (Ru) has also been used as a catalytic material for the electrochemical oxidation of methanol in fuel cells. Electrochemical studies have shown that ruthenium promotes the catalytic oxidation of methanol.

In addition, in single-element electrocatalysts, e.g., catalysts using only platinum or ruthenium, the overpotential for the methanol oxidation reaction is typically too high for large-scale practical use. In efforts towards optimizing the use of expensive platinum, and enhancing the oxidation rate and electrode stability, some binary metallic platinum-based electrodes have been studied in connection with the direct electrochemical oxidation of methanol. Electrodes with Pt/Ru (platinum/ruthenium), Pt/Rh (platinum/rhodium), and Pt/Pd (platinum/palladium) alloys, and Pt/Re (platinum/rhenium) electrodeposits, have been tested with some success. See, e.g., Ma et al., Mater. Res. Soc. Proc., 332:327–332 (1994). In addition, surface-modified platinum electrodes using adsorbed atoms for the second metal, such as gold (Au), tin (Sn), and lead (Pb), have been developed. Other combinations of metals have also been used. See, e.g., Cairati et al., U.S. Pat. No. 4,024,074 (iron molybdate and molybdenum trioxide).

Supporting some of these binary mixtures on conductive carbon has been shown to provide some improvements. See, e.g., Callstrom et al., U.S. Pat. No. 5,453,169. However, because these materials are relatively expensive or heavy or both, none of these mixtures has provided a lightweight, economical, highly active platinum-based electrocatalyst.

SUMMARY OF THE INVENTION

The invention is based on the discovery that a lightweight, economical, highly active platinum-based electrocatalyst can be obtained if platinum oxides and iron oxides are combined to form Pt/Fe particles in a colloidal solution.

In general, the invention features a method for preparing an electrocatalyst by adding iron oxide to a first solution including platinum, e.g., a bisulphate complex of platinum, to produce a second solution of platinum and iron oxide; and adding an oxidizing agent, e.g., hydrogen peroxide or peroxodisulphate, or other oxidizing agents that do not produce species that can coordinate with platinum, to the second solution and mixing the second solution under conditions and for a time sufficient to produce particles having an inner core of iron oxide and an outer shell of platinum oxide. The iron oxide core is not necessarily completely covered by the platinum oxide shell, but may include sporadic openings that expose the inner core.

In this method, the second solution can be mixed for, e.g., a period of approximately 24 hours.

The method can include a further step of adding carbon black particles to the second solution to create Platinum/Iron/Carbon (Pt/Fe/C) particles.

The method can also include a step of reducing a starting solution that includes $H_2PtCl_6$ to produce the first solution, wherein the first solution then includes platinum in the form of $H_3Pt(SO_3)_2OH$.

In the method, the oxidizing agent can be hydrogen peroxide. The hydrogen peroxide can be in the form of a solution that is approximately 35 percent hydrogen peroxide by weight.

In the method, the first and second solutions' pH can be maintained at a value of 4.5 to 5.5.

The method can also include a step of adding a support for the Pt/Fe particles.

The method can include further steps of adding carbon black particles to the second solution to create a paste that includes Pt/Fe/C particles and chloride compounds; aggregating in the paste a supernatant that includes the Pt/Fe/C particles; removing the supernatant from the paste; dispersing the supernatant into a third solution; testing the third solution for chloride; and repeating aggregation, removal, dispersion, and testing of the supernatant until the testing shows a lack of chloride in the supernatant of Pt/Fe/C particles.

In the method, the mixing of the second solution can occur at room temperature and can take place over a period of time of, e.g., at least 30 minutes or at least 24 hours.

In the method, the third solution can include double-distilled deionized water and the supernatant can be dispersed into the water using an ultrasonic bath.

In the method, the iron oxide can be added in an amount that produces a platinum-to-iron-oxide mole ratio of, e.g., approximately 0.5.

In another aspect, the invention features an electrocatalyst that includes a plurality of bimetallic colloidal particles, each particle having an inner core of iron oxide and an outer shell of platinum oxide. The electrocatalyst can further include a plurality of carbon particles. Each bimetallic particle can be polyangular. The diameter of each bimetallic particle can be between 50 nanometers and 90 nanometers.

The efficiency of the electrocatalyst can be approximately 5 times the efficiency of a platinum/carbon-based electrocatalyst.

In another aspect, the invention features a fuel cell that has an electrocatalyst that includes a plurality of bimetallic colloidal particles, each particle having an inner core of iron oxide and an outer shell of platinum oxide. The electrocatalyst of the fuel cell can further include a plurality of carbon particles.

In another aspect, the invention features a fuel cell that has an electrocatalyst prepared by the methods described herein.

In another aspect, the invention features a method of oxidizing an alcohol, the method including contacting an electrocatalyst having a plurality of bimetallic colloidal particles, each particle having an inner core of iron oxide and an outer shell of platinum oxide, with the alcohol, and contacting the alcohol with a composition that includes oxygen. The method of oxidizing an alcohol can occur in a fuel cell for providing electrical current, such that the method includes adding to the fuel cell the composition that includes oxygen, adding an anode that includes the electrocatalyst, the anode oxidizing the alcohol to provide electrons, and adding a cathode that accepts electrons to reduce the composition which includes oxygen.

The invention provides several advantages. For example, the use of expensive platinum is optimized by using an inexpensive, non-platinum core on which the platinum is grown, i.e., the platinum is used mainly to provide catalytic surface area, and is not consumed to provide a core. In addition, the core is made with a readily-available, relatively lightweight, and economical material, iron.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, the preferred methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION

The invention is based on the discovery that a lightweight, highly efficient, and economical platinum-based electrocatalyst can be obtained if platinum oxides and iron oxides are combined to form Pt/Fe particles in a method that includes (1) combining a solution including platinum, e.g., a bisulphate complex of platinum, e.g., a $H_3Pt(SO_3)_2OH$ solution, with iron oxide before adding an oxidizing agent, e.g., hydrogen peroxide or peroxodisulphate or other oxidizing agent that does not produce species that coordinate with platinum; and (2) providing a reaction period during which platinum oxides grow on iron oxide seed sols.

Bimetallic Pt/Fe (platinum/iron) colloidal particles were prepared by growing platinum oxides on iron oxide colloidal particles used as seed sols. These bimetallic colloidal particles were monodispersed and have a polyangular shape. A Pt/Fe/C bimetallic electrocatalyst was then synthesized using carbon black, e.g., VULCAN® XC-72™, as support for the Pt/Fe particles. Other materials, including non-carbon materials such as $Al_2O_3$, $BaSO_4$, and $SiO_2$, can also be used as support for these Pt/Fe particles.

As discussed below, electrochemical measurements of the Pt/Fe/C colloidal particles used as an electrocatalyst for methanol oxidation demonstrated that this catalyst has a high electrochemical efficiency. The catalyst can also be used to enhance chemical reactions involving other materials, e.g., carbonyls, including other alcohols, such as ethanol, propanol, and butanol, and carbon monoxide, aldehydes, and ketones. The effects of different preparation conditions, including reaction time and the order of adding chemicals, on the formation of the bimetallic colloidal particles are also discussed below.

The results of transmission electron microscopy (TEM) and energy dispersive x-ray spectroscopy (EDXS) demonstrated that:

(1) The sizes of platinum and platinum oxide colloidal particles were controlled by the length of the reaction time after the addition of hydrogen peroxide into the platinum complex solution. For example, a reaction time of 24 hours resulted in large, i.e., 40 to 100 nanometer (nm), platinum oxide/iron oxide colloidal particles, whereas a shorter reaction time, 30 minutes, produced smaller colloidal particles (10 to 50 nm); and (2) The order of adding the oxidizing agent and the iron oxide colloidal particles was important for the formation of the Pt/Fe bimetallic particles of the invention. Separate particles of platinum oxide and iron oxide were produced when hydrogen peroxide was added first. In contrast, the new, combined Pt/Fe bimetallic colloidal particles were created when iron oxide colloidal particles were added to the solution prior to the addition of hydrogen peroxide.

Cyclic voltammetry was used to determine the electrochemical efficiencies of the Pt/Fe/C catalysts for methanol oxidation. For example, in comparing Pt/Fe/C catalysts prepared with 2- and 48-hour reaction times, a significantly higher electrochemical efficiency, almost twice as high, was observed for the catalyst with the 48-hour reaction time than was observed for the catalyst with the 2-hour reaction time. And a "48-hour" Pt/Fe/C electrocatalyst produced a peak current of 0.1 A/mg Pt compared to 0.03 A/mg pt for a Pt-only electrocatalyst. In general, the Pt/Fe electrocatalysts are operable as catalysts as soon as the iron oxide and the platinum oxide begin to form particles and the efficiencies of the Pt/Fe electrocatalysts improve continuously thereafter through longer reaction times, up to 48 hours. Thus, catalytic efficiencies improve successively after 30 minutes, e.g., 2 hours, 10 hours, 18 hours, and 24 hours. The improvement gained by using the 48-hour reaction time instead of the 24-hour reaction time was measurable but was not significant.

The electrochemical efficiencies of the Pt/Fe/C catalyst prepared by introducing iron oxide particles prior to the addition of hydrogen peroxide increased to a maximum after several potentiodynamic cycles and then dropped. In contrast, for the catalyst prepared by adding hydrogen peroxide before introducing iron oxide, the electrochemical efficiencies of the catalyst were low and started increasing only after dissolution of the iron oxide.

PREPARATION OF Pt/Fe/C ELECTROCATALYSTS

There are two stages in the preparation of the Pt/Fe/C electrocatalyst according to the invention. In stage one, iron oxide colloidal particles and a solution including a bisulphate complex of platinum, e.g., a $H_3Pt(SO_3)_2OH$ solution, are prepared. In stage two, an electrocatalyst of Pt/Fe bimetallic particles is formed and then the Pt/Fe particles are supported on carbon black to form the Pt/Fe/C electrocatalyst.

The iron oxide colloidal particles are produced in stage one by reacting ferric chloride ($FeCl_3$) with hydrochloric acid at 100° C. and then purifying the resulting particles by removing chloride, as described below. Independently, the $H_3Pt(SO_3)_2OH$ solution is produced by reducing chloroplatinic acid ($H_2PtCl_6$) with sodium bisulfite ($NaHSO_3$).

The iron oxide particles and the $H_3Pt(SO_3)_2OH$ solution are then used in stage two to produce Pt/Fe particles as follows. The iron oxide particles are added to the $H_3Pt(SO_3)_2OH$ solution in an amount that provides a platinum-to-iron-oxide mole (M) ratio of 1:2. Next, an oxidizing agent, such as hydrogen peroxide or peroxodisulphate or another oxidizing agent that does not produce species that can coordinate with platinum, is added to oxidize the $H_3Pt(SO_3)_2OH$. Finally, the resulting solution is stirred for up to 48 hours to form the Pt/Fe particles. A preferred reaction time is at least approximately 24 hours.

The details of the preparation of the $H_3Pt(SO_3)_2OH$ solution, the iron oxide colloidal particles, and the Pt/Fe bimetallic colloidal particles are provided in the following examples.

EXAMPLE 1

Preparation of $H_3Pt(SO_3)_2OH$ Solution

In an aqueous solution, one gram of chloroplatinic acid ($H_2PtCl_6$, Aldrich, Milwaukee, Wis.) was reduced with four grams of $NaHSO_3$ (J. T. Baker), as shown in equation (2) below. Half a mole of $NaHCO_3$ was used to keep the solution at a pH value of 4.5 to 5.5, preferably 5.0. HCl gas was evaporated.

$$H_2PtCl_6 + 3NaHSO_3 + 2H_2O \rightarrow H_3Pt(SO_3)2OH + Na_2SO_4 + NaCl + 5HCl \qquad (2)$$

EXAMPLE 2

Preparation of Iron Oxide

An iron oxide particle sol, which has particles of well-defined size and shape, was prepared using the principle of forced hydrolysis of homogeneous metal salts. See, e.g., Sugimoto et al, *J. Colloid & Interface Sci.*, 74:227 (1980); Matijevic et al, *J. Colloid & Interface Sci.*, 63:509 (1978). This preparation has been found to produce iron oxide colloidal particles that are monocrystalline with a regular shape.

All chemicals were reagent grade (Mallinckrodt). Double deionized distilled water (17.7 megohm-cm) was used for all the solutions. All glassware was cleaned with hydrochloric acid, extensively rinsed with deionized water, and dried in an oven at 95° C. Stock solutions of ferric chloride were prepared in high concentration, approximately 2.6M, in $10^{-3}M$ $HClO_4$ to prevent hydrolysis at room temperature.

To prepare the sol, a solution of 975 milliliters (ml) of $3.75 \times 10^{-3}M$ HCl was heated to boiling in a 2 liter (L) round bottom flask equipped with a reflux condenser. To this boiling solution was added 25 ml of a solution containing 0.72M ferric chloride and $3.75 \times 10^{-3}M$ HCl. Vigorous stirring was maintained throughout the addition to ensure immediate homogenization of the mixture. Following the addition of the ferric chloride solution, stirring was continued for 24 hours at approximately 100° C. to complete the formation of the iron oxide colloidal particles.

The resulting suspensions were allowed to settle at room temperature, and the sols were flocculated by the addition of solid KCl, up to a final concentration of 150 mM. After sedimentation of the flocs, the supernatant was discarded and the remaining suspension was centrifuged. The centrifuged sol was re-dispersed in $10^{-3}M$ $HClO_4$ by ultrasonification. Centrifugation and ultrasonification were repeated several times in $10^{-3}M$ $HClO_4$ to further purify the final product. The purified sol was suspended in $10^{-3}M$ $HClO_4$ and either can be used immediately or stored in a refrigerator for further application, discussed below.

EXAMPLE 3

Preparation of Pt/Fe/C Electrocatalysts

The products of Examples 1 and 2 above were used to prepare Pt/Fe/C electrocatalysts as follows. The iron oxide colloidal particles were added to the $H_3Pt(SO_3)_2OH$ solution such that the mole ratio of platinum to iron oxide was 1:2. A hydrogen peroxide solution (35 wt. %) was used to oxidize the $H_3Pt(SO_3)_2OH$ complex to platinum oxide, as shown in equation (3) below. As discussed below, changing this order, i.e., adding the hydrogen peroxide solution before the iron oxide particles, was tested and deemed less preferable. One-tenth of a mole of NaOH was used to keep the solution at a pH level of 4.5 to 5.5, preferably 5.0.

$$H_3Pt(SO_3)_2OH + 3H_2O_2 \rightarrow PtO_2 + 3H_2O + 2H_2SO_4 \quad (3)$$

Different batches of the above solution were stirred at room temperature for reaction periods varying from 30 minutes to 48 hours, producing Pt/Fe particles. It was determined that a reaction period of at least approximately 24 hours was sufficient to form satisfactory Pt/Fe particles.

Vulcan® XC-72™ carbon black particles, 0.237 g, were then added into the reaction system to adsorb the Pt/Fe particles to form a black paste. Some batches of the black paste were bubbled with hydrogen gas for 30 minutes to reduce the metal oxides. As discussed below, hydrogen bubbling was not necessary when the reaction period mentioned above was such that no metal oxides remained to be reduced.

The Pt/Fe/C particles in the paste were allowed to aggregate in preparation for purification, i.e., chloride removal. After the supernatant was removed, double-distilled deionized water was used to disperse the sol in an ultrasonic bath. The procedure was repeated until the supernatant showed no AgCl precipitate when the supernatant was tested by adding 0.1M $AgNO_3$ solution.

ELECTROCHEMISTRY OF THE Pt/Fe/C ELECTROCATALYST

A Pt/Fe/C working electrode was prepared as follows. One hundred milligrams of a sample of the electrocatalyst Pt/Fe/C were mixed with 10.0 ml of dehydrated absolute ethanol (Quantum Chemical). This mixture was dispersed by an ultrasonic bath for 20 minutes. The catalyst particles were distributed evenly throughout the solution. Equal amounts by mass of the catalyst/ethanol solution and NAFION® (Aldrich) were evenly mixed in an ultrasonic bath for 20 minutes. NAFION® is a polymer of a perfluorinated ion-exchange powder 5 wt. % solution in a mixture of lower aliphatic alcohol and water. NAFION® is used as a binder for the catalyst particles to bind onto the glassy carbon working electrode and serves mainly as a proton exchange membrane (PEM).

To prepare a catalyst/Nafion® working electrode, a microsyringe was used to deliver 20 microliters (μl) of the catalyst/Nafion® paste onto the surface of the glassy carbon electrode. The diameter of the glassy carbon electrode was 6 mm. The coated electrode was left to air dry. Before the electrochemical measurements, the catalyst/Nafion® electrode was dipped into double-distilled deionized water and air dried. This procedure was repeated several times. The treated electrode was then placed in double-distilled deionized water until needed.

Figure 1:
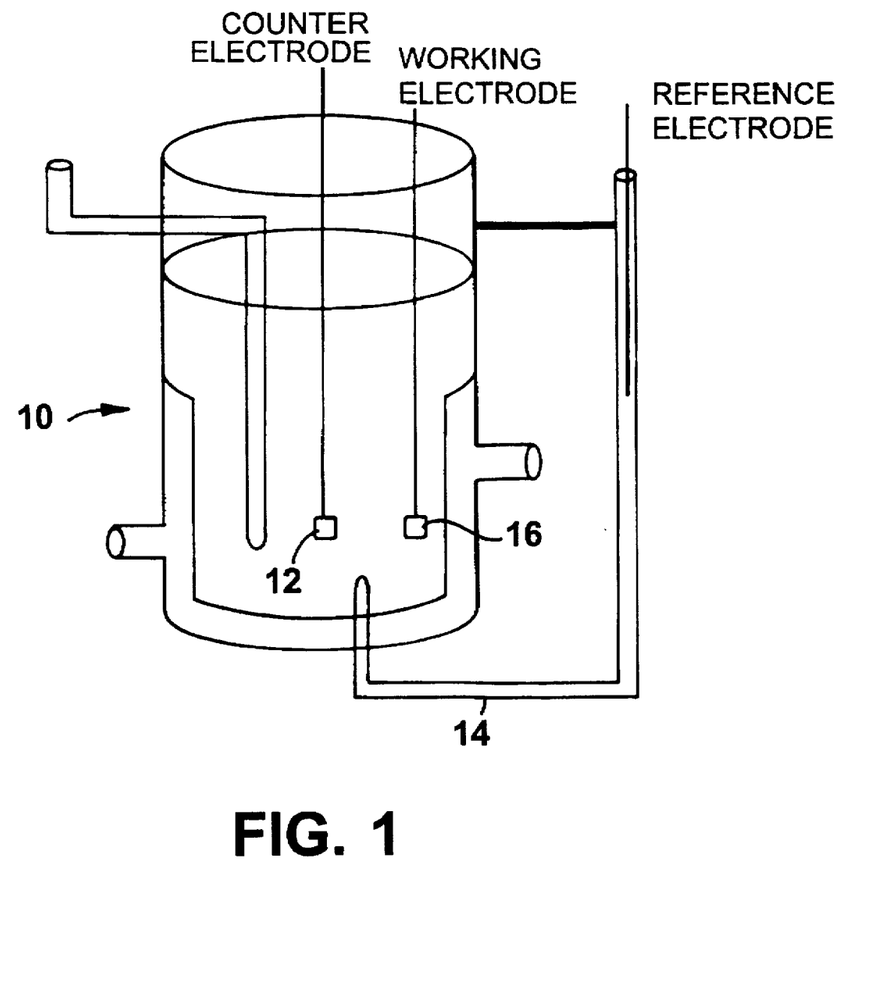
FIG. 1 is a schematic of an electrochemical cell used for electrochemistry measurements of electrocatalysts.

FIG. 1 shows a schematic of an electrochemical cell 10 used to study the electrochemical oxidation of 1M methanol in a 0.1M $H_2SO_4$ electrolyte solution. A platinum wire was used as a counter electrode 12 and a $Pd/H_2$ electrode was used as a reference electrode 14.

The Pt/Fe/C electrocatalyst coated glassy carbon electrode was used as the working electrode 16, and was analyzed for its electrochemical properties using cyclic voltammetry. In cyclic voltammetry a voltage sweep is applied to a test object (working electrode) and a voltage-current curve known as a voltammograph is recorded. The voltage is usually started at a minimum value, is linearly increased to a maximum peak, and then is linearly decreased back to the minimum value.

Figure 2:
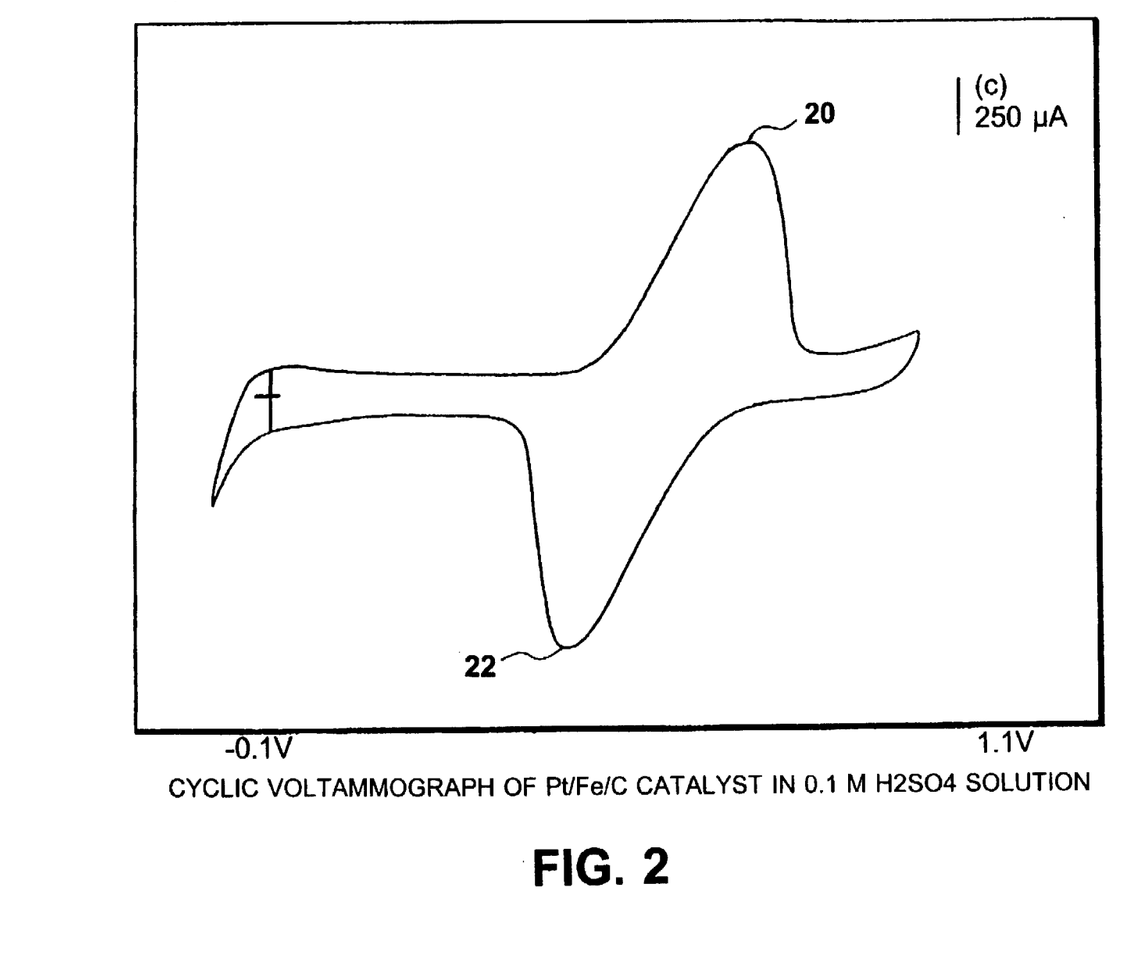
FIG. 2 is a cyclic voltammograph of a Platinum/Iron/Carbon (Pt/Fe/C) electrocatalyst.

The electrodes were placed in the electrochemical cell for determination of the cyclic voltammographs. Current-potential curves were obtained at a scan speed of 2 mV/s. An EG&G Princeton Applied Research Potentiostat/Galvanostat Model 273, which was connected to an IBM Instruments 7424 MT x-y-T recorder, was used in the cyclic voltammograph measurements. FIG. 2 shows the cyclic voltammograph of the Pt/Fe/C catalyst in a 0.1M $H_2SO_4$ electrolyte solution, without methanol. For the Pt/Fe/C catalyst, the oxidation (anodic) peak 20 was at 820 mV and the reduction (cathodic) peak 22 was at 510 mV. These peaks are the combination of the peaks of a Pt/C catalyst and a Fe/C catalyst, confirming the presence of Pt and Fe.

Figure 3:
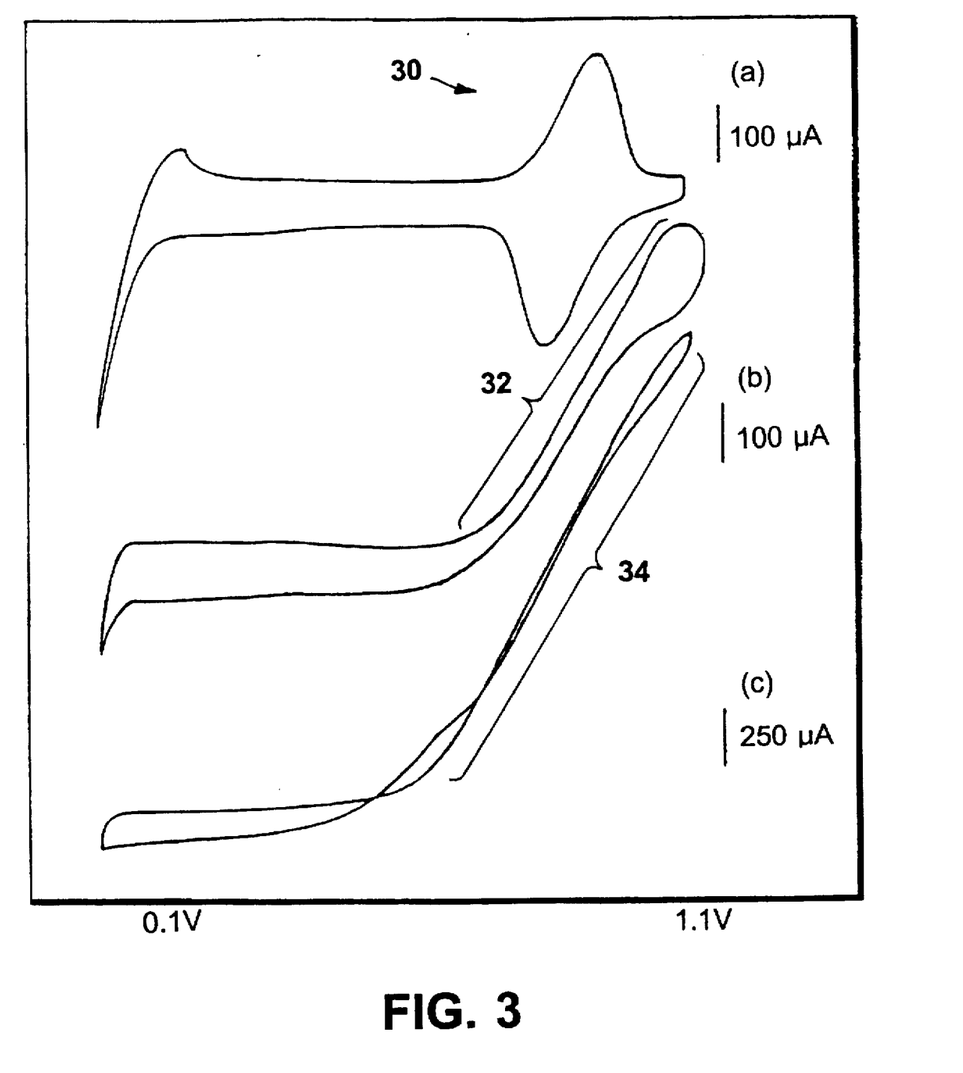
FIG. 3 is a set of three cyclic voltammographs for an iron oxide catalyst, a platinum oxides catalyst, and a Pt/Fe/C electrocatalyst.

FIG. 3 shows a comparison of cyclic voltammographs of three catalysts: a Fe/C catalyst, a conventional Pt/C catalyst, and a Pt/Fe/C catalyst, for direct methanol oxidation in a 0.1M $H_2SO_4$ solution. The cyclic voltammograph of Fe/C 30 has the same shape as its shape in a non-methanol 0.1M $H_2SO_4$ electrolyte solution, so no methanol oxidation is apparent for the Fe/C catalyst. However, there is a methanol oxidation peak 32 for the Pt/C catalyst, and a strong methanol oxidation peak 34 for the Pt/Fe/C catalyst. The Pt/Fe/C catalyst has a much higher oxidation efficiency than that of the Pt/C catalyst, amounting to a five-fold increase. Thus, the Pt/Fe/C electrocatalyst containing Fe has a much higher electrochemical efficiency for methanol oxidation than that of a conventional Pt-only catalyst.

Figure 4:
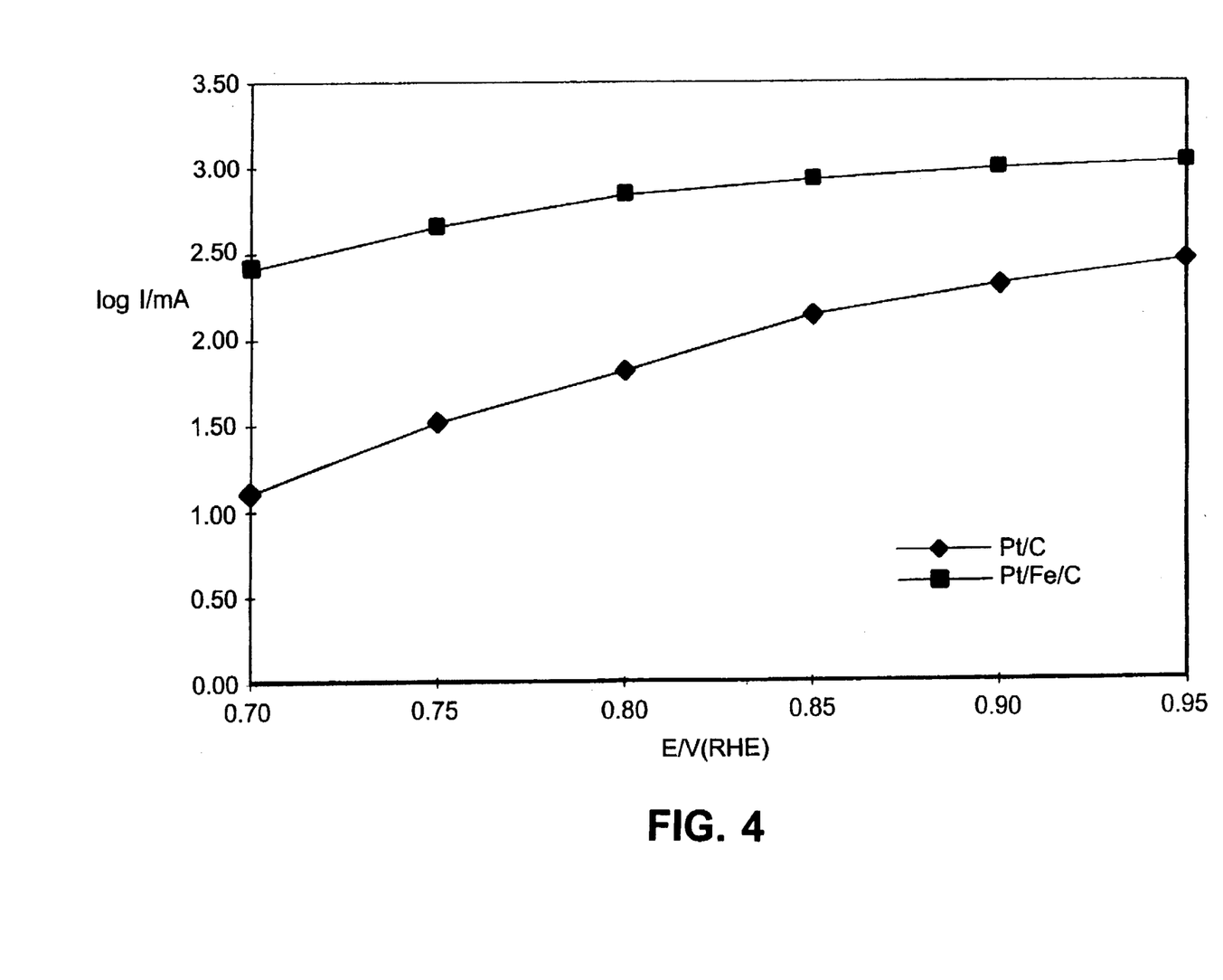
FIG. 4 is a logI vs. E plot of a Pt/C catalyst and a Pt/Fe/C catalyst.

FIG. 4 shows a logI v. E plot in which the catalytic activities of the Pt/Fe/C catalyst were compared with those of the Pt/C catalyst for the electrochemical oxidation of methanol. The catalytic activities are related to the logI values such that under the same electrical potential E, a higher logI value corresponds to a higher level of catalytic activity. The Pt/Fe/C catalyst had a higher catalytic activity than the Pt/C catalyst in spite of the fact that the two catalysts contain similar amounts of platinum. The Pt content in Pt/C was 18 wt. % and the Pt and Fe contents in the Pt/Fe/C catalyst were 16 and 11 wt. %, respectively.

The metal contents in the Pt/Fe/C electrocatalyst were calculated using the following research-supported assumptions: (1) No major components (Pt, Fe, C) were lost during the preparation and all were 100% collected into the final products; (2) the final products were 100% pure, and the quantities of impurities were negligible after repetitive cleaning by double distilled deionized water (in view of the fact that the atomic weight of oxygen is much smaller than the major components (Pt, Fe), the weight, or mass, contribution from oxygen has been omitted); and (3) the yield is equal to the actual mass of the final product divided by the theoretical mass of the final product.

A sample calculation of Pt and Fe contents in the Pt/Fe/C (XC-72™) catalyst is shown as follows.

Chemicals used in the preparation of Pt/Fe/C catalyst included:

| | | |
|---|---|---|
| $H_2PtCl_6$ | 2 ml × 0.0768 M; | |
| $Fe_2O_3$ | 4 ml × 0.08 M; and | |
| Vulcan® XC-72R ™ (carbon black) | | 0.237 g. |

The weight (mass) of elements in the solution was calculated as:

Wt (Pt)=2 ml×0.0768M×195.08 g/mol=30 mg;

Wt (Fe)=4 ml×0.8M×2×55.85 g/mol=36 mg; and

Wt (C)=0.237 g.

In the final product, the weight (mass) of the catalyst was

Wt (Pt/Fe/C catalyst)=0.273 g; and

Yield %=0.273 g/(0.237+0.030+0.036) g=90.2%.

Therefore, the metal contents in the final products was calculated as:

Pt wt %=30 mg/(30+36+237) mg=9%; and
Fe wt %=36 mg/(30+36+237) mg=12%.

Three different reaction conditions were investigated and are shown in Table 1 with respect to the Pt/Fe electrocatalysts: (1) the reaction times of 2 hours and 24 hours; (2) the presence or lack of hydrogen bubbling treatment; and (3) the order of adding the chemicals iron oxide and hydrogen peroxide. Table 1 shows the peak current ($I_{peak}$) and the peak potential ($E_{peak}$) for methanol oxidation and the current (I) at a specific potential (E) of 900 mV.

TABLE 1

Electrochemical efficiencies for methanol oxidation of Pt/Fe/C electrocatalysts prepared under different reaction conditions

| Sample | reaction time (h) | added first | $H_2$ | $I_{peak}$ (A) | $E_{peak}$ (mV) | I (A) | E (mV) |
|---|---|---|---|---|---|---|---|
| Cat. 1 1st run | 24 | $Fe_2O_3$ | yes | 590 | 910 | 580 | 900 |
| | | | | 615 | 910 | 600 | 900 |
| | | | | 700 | 890 | 700 | 900 |
| Cat. 1 2nd run | 24 | $Fe_2O_3$ | yes | 615 | 890 | 610 | 900 |
| | | | | 590 | 900 | 590 | 900 |
| Cat. 2 | 24 | $Fe_2O_3$ | no | 330 | 950 | | |
| | | | | 525 | 890 | | |
| | | | | 550 | 890 | | |
| | | | | 465 | 910 | | |
| Cat. 3 | 24 | $H_2O_2$ | no | 19 | 720 | 15 | 900 |
| Cat. 4 | 24 | $Fe_2O_3$ | no | 520 | 900 | 520 | 900 |
| | | | | 510 | 890 | 505 | 900 |
| Cat. 5 | 2 | $Fe_2O_3$ | no | 208 | 860 | 205 | 900 |
| | | | | 223 | 860 | 220 | 900 |
| | | | | 225 | 880 | 218 | 900 |
| | | | | 250 | 880 | 215 | 900 |
| Cat. 6 | 2 | $H_2O_2$ | no | no reaction | | | |
| Cat. 7 | 2 | $Fe_2O_3$ | yes | 243 | 860 | 235 | 900 |
| | | | | 238 | 880 | 228 | 900 |
| | | | | 235 | 880 | 228 | 900 |

Two subsets of the seven Pt/Fe/C catalysts were compared for reaction time and are shown in Table 1. Catalysts 1, 2, 3, and 4 had a 24-hour reaction time. Catalysts 5, 6, and 7 had a 2-hour reaction time. The catalysts with the 24-hour reaction time had higher electrochemical efficiencies as indicated by the peak currents that range from 500 μA to 700 μA. The catalysts with the 2-hour reaction time had lower electrochemical efficiencies of 200 μA to 250 μA. This difference occurred because a longer reaction time allowed a more complete formation of platinum oxide on the surface of the iron oxide colloidal particles. The more complete formation of platinum oxide on the surface of the iron oxide optimized the platinum surface area, yielding the higher electrochemical efficiency.

The differences among catalysts with the same reaction time in Table 1 correspond to the presence or lack of the hydrogen bubbling treatment. Other reaction conditions within the same reaction time group were identical. In the 24-hour group, Catalyst 1 was treated with hydrogen bubbling whereas Catalyst 2 and Catalyst 4 were not. Catalyst 1 had peak currents of 500 μA to 700 μA as compared to Catalyst 2 and Catalyst 4 which had peak currents of 330 μA to 550 μA. Therefore, the difference in currents of these catalysts with and without hydrogen bubbling treatment was approximately 150 μA.

In the 2-hour group, Catalyst 7 was treated with hydrogen bubbling whereas Catalyst 5 was not. Both catalysts had peak currents of approximately 225 μA and currents of approximately 215 μA at a specific potential of 900 mV. Thus the overall difference in currents of catalysts with and without hydrogen bubbling treatment was small, approximately 15 μ. The logI vs. E curves within the same group are similar. Therefore, hydrogen bubbling treatment of the final Pt/Fe/C catalysts had some, but not much, influence on the electrochemical efficiency of the final Pt/Fe/C catalysts.

The purpose of the hydrogen bubbling treatment was to reduce the metal oxides to metal elements. If all the platinum metal was in its elemental form already, the hydrogen bubbling treatment was not necessary. However, hydrogen bubbling became useful if part of platinum was in its oxidation forms.

During the preparation of Catalyst 3 and Catalyst 6, the oxidizing agent hydrogen peroxide was added to the solution before iron oxide was added. With reference to Table 1, both of these catalysts had low electrochemical efficiencies, i.e., current (I) levels, for methanol oxidation. The other five catalysts of Table 1 were prepared by adding iron oxide particles into the solution first, and displayed much higher electrochemical efficiencies.

TEM and EDXS measurements also showed that the order of adding the chemicals hydrogen peroxide and iron oxide into the solution was important for the formation of the proper Pt/Fe bimetallic particles. When hydrogen peroxide was added into the solution first, separate iron oxide and platinum oxide particles were formed instead of Pt/Fe particles. In this "$H_2O_2$-first" catalyst, since the mole ratio of Pt/$Fe_2O_3$ was 1:2, the excess amount of iron oxide particles dominated the platinum particles so that the methanol oxidation efficiencies were depressed.

This dominance was confirmed by multiple scan cyclic voltammographs (FIG. 5), which illustrated the multiple scan effects on the electrochemical efficiency of Pt/Fe/C Catalyst 6 for 1M methanol oxidation in 0.1M $H_2SO_4$ electrolyte solution. At the beginning of the cycles, only reversible $Fe^{+3}/Fe^{+2}$ oxidation/reduction peaks 50 at approximately 730 mV were apparent, indicating iron oxide dominance and no electrochemical oxidation of methanol for Catalyst 6. As the potentiodynamic cycles increased, the methanol oxidation peaks 52 appeared and became stronger. Thus, in this process of testing the $H_2O_2$-first catalyst, iron oxide played an important role in the beginning cycles.

Figure 5:
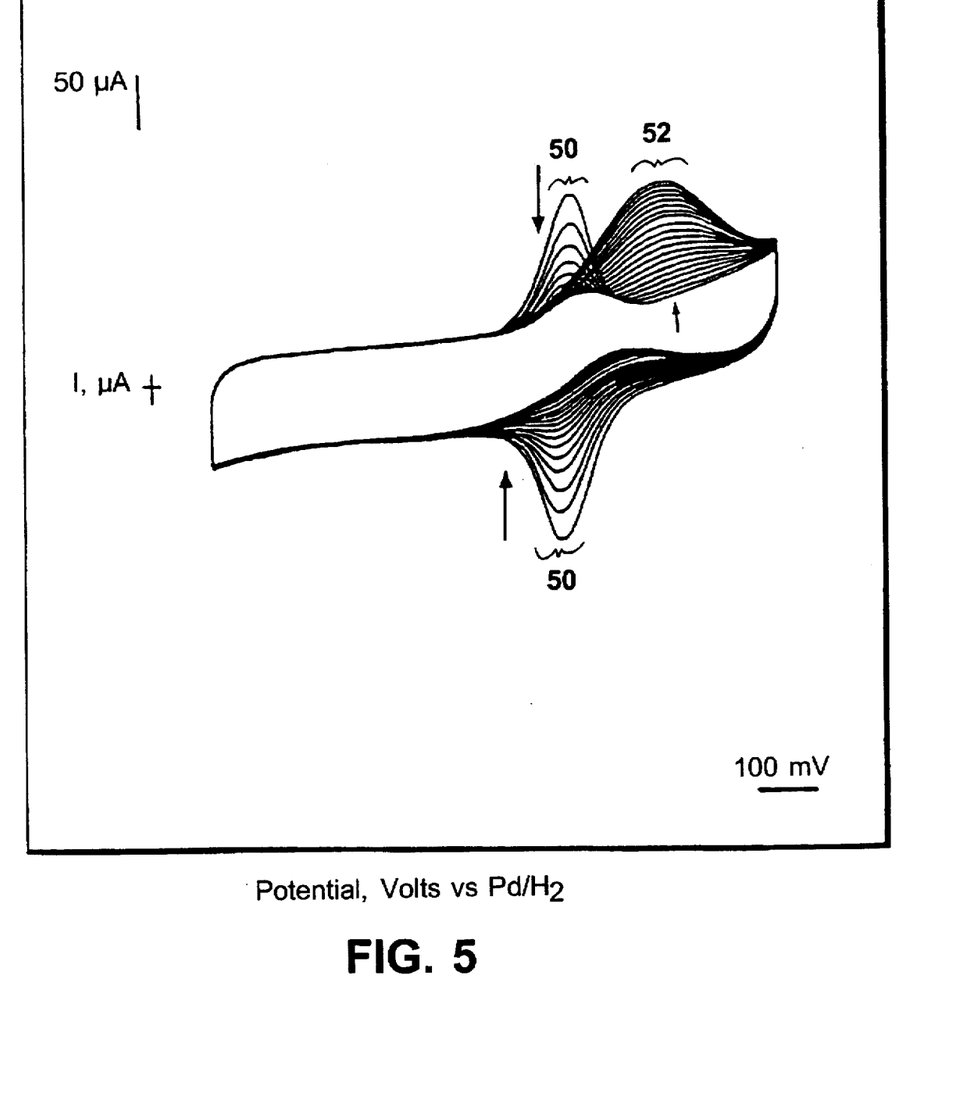
FIG. 5 is a set of scan cyclic voltammographs of an "$H_2O_2$-first" electrocatalyst.

Only after a delay before the iron oxide dissolved into the 0.1M $H_2SO_4$ solution were the platinum oxides able to take part in the reduction/oxidation reaction. This iron-oxide dominance delay does not exist in the preferable "iron-oxide-first" catalyst.

In summary, the results showed that a higher electrochemical efficiency for methanol oxidation was gained when the Pt/Fe electrocatalysts were prepared by using a longer reaction times, e.g., 24 hours, and by adding iron oxide before hydrogen peroxide into the solution. Furthermore, hydrogen bubbling treatment on the Pt/Fe/C paste had only moderate effects on the methanol oxidation efficiency of the catalyst.

Noted briefly above were the effects, on the formation of Pt/Fe bimetallic colloidal particles, of the order of the addition of chemicals. Specifically, two variations of the preparation method were used to measure these effects. In the first variation, Pt/Fe particles were prepared by adding hydrogen peroxide into the platinum solution first and the solution was allowed to react for 30 minutes. Iron oxide particles in stock solution were then added into the solution. This variation resulted in an orange-red colloidal solution. One drop of this turbid solution was diluted by 1 ml of methanol solution and was dispersed by an ultrasonic gun. Under TEM and EDXS measurements, separate phases of platinum oxides and iron oxide particles were detected from EDXS spectra. One group of EDXS spectra contained only a platinum metal element. Another group of EDXS spectra contained mainly iron metals with trace amounts of platinum, sodium, and sulfur elements. The trace elements were expected because, as noted above, sodium and sulfur elements were involved in the Pt/Fe catalyst preparation.

Microscopic examination of the samples was carried out on a Philip 400T scanning transmission electron microscope operated at 120 keV. The chemical composition analyses were done on a Noran Instrument 5500 low-Z energy dispersive x-ray spectrometry system. The various phases in the samples were identified by electron diffraction and EDXS with an electron diffraction simulation program.

With reference to the EDXS and TEM results, two kinds of particles were observed under TEM for the first variation: one kind of particle having a polyangular shape, iron oxide, and another having a near-spherical shape, platinum oxide. These results indicated no formation of Pt/Fe bimetallic particles. Thus, platinum oxides nuclei were generated as soon as hydrogen peroxide was added and platinum oxides particles continued to grow along their own nuclei.

Figure 6:
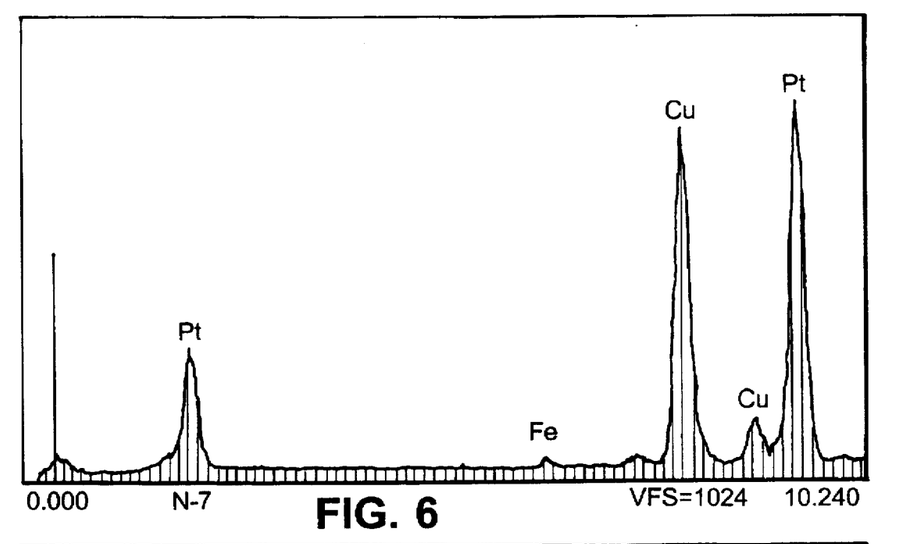
FIG. 6 is an energy dispersive x-ray spectroscopy (EDXS) graph of separate platinum oxide colloidal particles.
Figure 7:
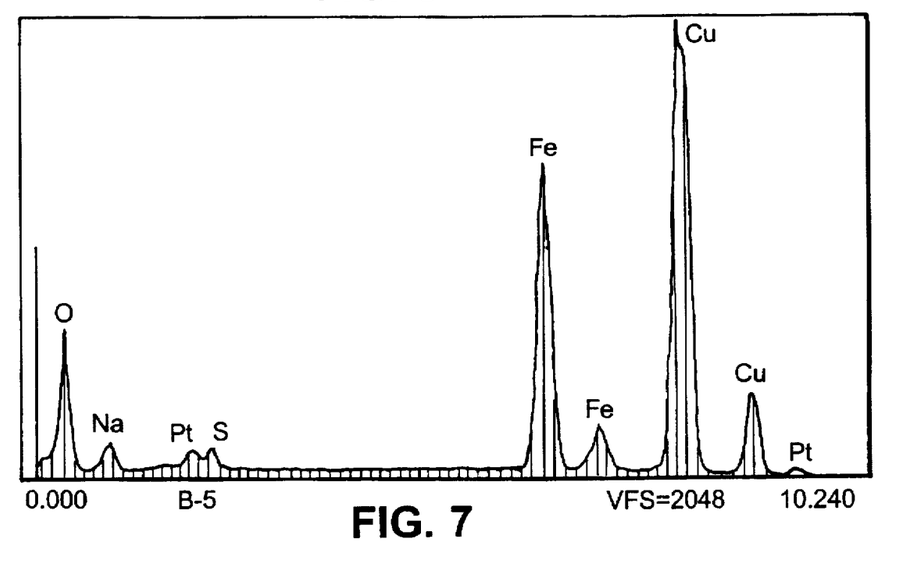
FIG. 7 is an EDXS graph of separate iron oxide colloidal particles.

With reference to the EDXS spectrum in FIG. 6, EDXS showed that the platinum oxide particles (Pt) were quite iron-free. Strong platinum metal element peaks appear, while iron metal element (Fe) peaks are almost invisible. Copper peaks (Cu) also appear because the EDXS testbed included copper. Hence, when the iron oxide particles were added into the solution after an expiration time, most of the platinum element had already formed its own particles, although trace amounts of platinum did combine with the iron oxide particles.

Figure 8:
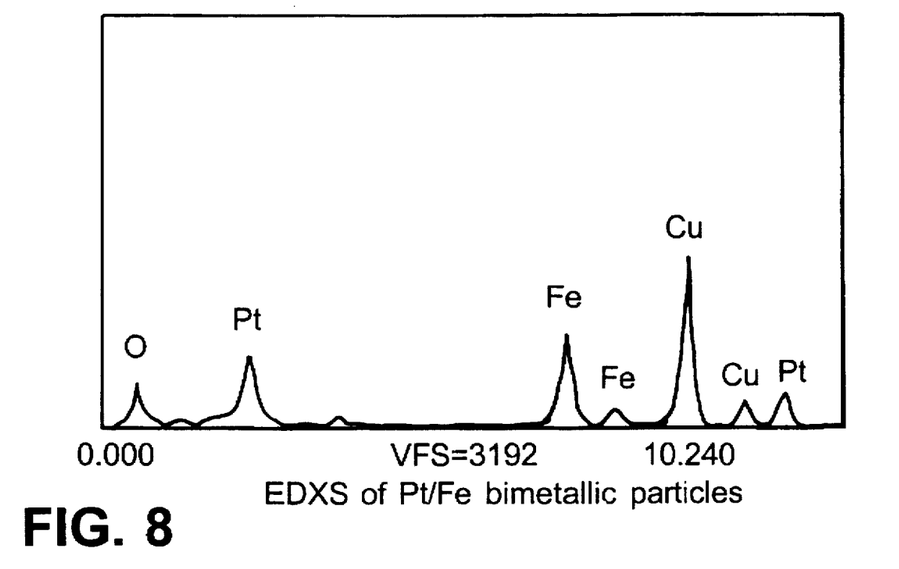
FIG. 8 is an EDXS graph of Pt/Fe bimetallic colloidal particles.

In the second variation of the preparation method, iron oxide particles were added to the solution before an appropriate amount of hydrogen peroxide was added. The solution was then stirred for a period of 24 hours. A dark red solution was produced and the particles were allowed to settle. The color of the aggregates changed from dark red to black when exposed to air for several days. A drop of this aggregate was diluted with methanol. TEM and multiple EDXS measurements confirmed the combination of platinum and iron. Thus, because iron oxide particles were added into the solution before hydrogen peroxide was added, the iron oxide particles served as nuclei. Platinum oxides grew on the nuclei after hydrogen peroxide was added into the solution and platinum oxides were generated from the platinum complex. As shown in FIG. 8, both Pt and Fe EDXS spectra peaks were reasonably strong for the Pt/Fe particles.

Figure 9:
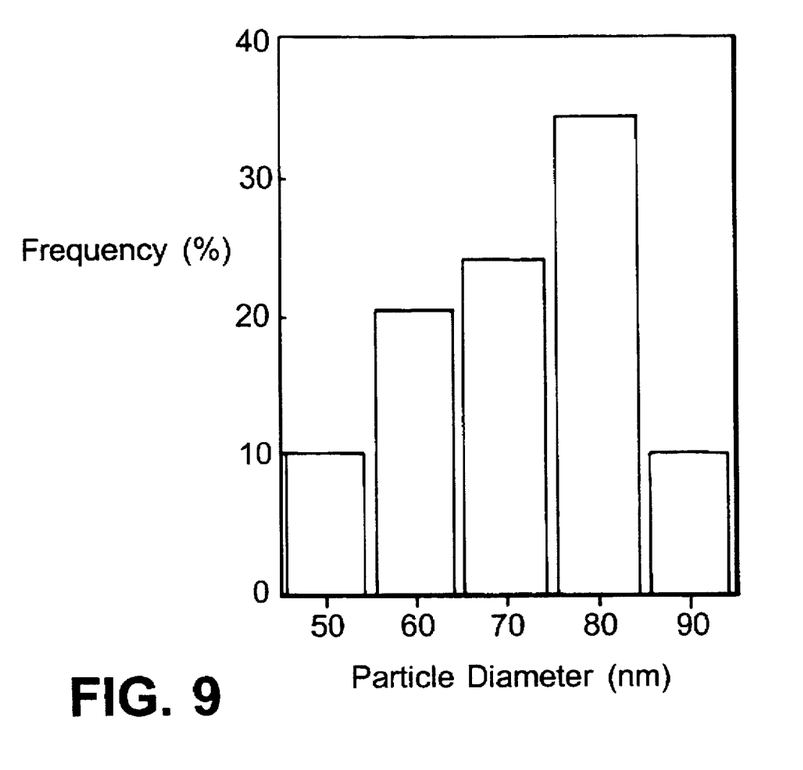
FIG. 9 is a bar chart showing the size distribution of Pt/Fe bimetallic colloidal particles.

TEM observations indicated that these Pt/Fe bimetallic colloidal particles had a polyangular shape that was similar to that of the iron oxide particles. The size distribution of the Pt/Fe bimetallic colloidal particles is indicated in FIG. 9. The Pt/Fe particles were larger on average than the iron oxide particles, but smaller on average than the 24-hour platinum oxide particles. This size relationship further indicated that a layer of platinum oxide had grown around iron oxide seed particles.

The difference in the results of these two variations showed that the order of the addition of chemicals, i.e., iron oxide before hydrogen peroxide, into the reaction system was important for the formation of the Pt/Fe bimetallic particles of the invention.

OTHER EMBODIMENTS

It is to be understood that while the invention has been described in conjunction with the detailed description thereof, that the foregoing description is intended to illustrate and not limit the scope of the invention, which is defined by the scope of the appended claims. Other aspects, advantages, and modifications are within the scope of the following claims.

What is claimed is:

1. A method for preparing an electrocatalyst, said method comprising adding iron oxide to a first solution comprising platinum to produce a second solution comprising iron oxide and platinum; and adding an oxidizing agent to the second solution and mixing the second solution under conditions and for a time sufficient to produce particles, each particle comprising an inner core of iron oxide and an outer shell of platinum oxide.

2. The method of claim 1, wherein the second solution is mixed for a period of at least 18 hours.

3. The method of claim 1, further comprising adding carbon black particles to the second solution to create Platinum/Iron/Carbon (Pt/Fe/C) particles.

4. The method of claim 1, further comprising reducing a starting solution comprising $H_2PtCl_6$ to produce the first solution, wherein the first solution then comprises platinum in the form of $H_3Pt(SO_3)_2OH$.

5. The method of claim 1, wherein the oxidizing agent is hydrogen peroxide.

6. The method of claim 5, wherein the hydrogen peroxide is added in the form of a solution that is 35 percent hydrogen peroxide by weight.

7. The method of claim 5, wherein the first and second solutions' pH is maintained at a value of 4.5 to 5.5.

8. The method of claim 1, further comprising adding a support for the particles.

9. A method for preparing an electrocatalyst, said method comprising reducing a starting solution comprising $H_2PtCl_6$ to produce a first solution, wherein the first solution comprises platinum in the form of $H_3Pt(SO_3)_2OH$;

adding iron oxide to the first solution to produce a second solution comprising iron oxide and platinum;

adding an oxidizing agent to the second solution and mixing the second solution under conditions and for a time sufficient to produce particles, each particle comprising an inner core of iron oxide and an outer shell of platinum oxide;

adding carbon black particles to the second solution to create a paste comprising Pt/Fe/C particles and chloride compounds;

aggregating in the paste a supernatant comprising the Pt/Fe/C particles;

removing the supernatant from the paste;

dispersing the supernatant into a third solution;

testing the third solution for chloride; and repeating aggregation, removal, dispersion, and testing of the supernatant until the testing shows a lack of chloride in the supernatant of Pt/Fe/C particles.

10. The method of claim 1, wherein mixing the second solution occurs at room temperature and takes place over a period of time of at least 30 minutes.

11. The method of claim 1, wherein mixing the second solution occurs at room temperature and takes place over a period of time of at least 24 hours.

12. The method of claim 9, wherein the third solution comprises double-distilled deionized water and the supernatant is dispersed into the water using an ultrasonic bath.

13. The method of claim 1, wherein the iron oxide is added in an amount that produces a platinum-to-iron-oxide mole ratio of approximately 0.5.

14. An electrocatalyst comprising a plurality of bimetallic colloidal particles, each particle comprising an inner core of iron oxide and an outer shell of platinum oxide.

15. The electrocatalyst of claim 14 further comprising a plurality of carbon particles.

16. The electrocatalyst of claim 14, wherein each bimetallic particle is polyangular.

17. The electrocatalyst of claim 14, wherein the diameter of each bimetallic particle is no less than 50 nm and no more than 90 nm.

18. The electrocatalyst of claim 15, wherein the electrocatalyst has approximately 5 times the efficiency of a platinum/carbon-based electrocatalyst for direct methanol oxidation.

19. A fuel cell comprising the electrocatalyst of claim 14.

20. A fuel cell comprising the electrocatalyst of claim 15.

21. A fuel cell comprising an electrocatalyst produced using the method of claim 1.

22. A method of oxidizing an alcohol comprising contacting the electrocatalyst of claim 14 with the alcohol, and contacting the alcohol with a composition comprising oxygen.

23. The method of claim 22, wherein the oxidizing occurs in a fuel cell for providing electrical current, the method further comprising adding to the fuel cell the composition comprising oxygen;

adding an anode comprising the electrocatalyst, the anode oxidizing the alcohol to provide electrons; and adding a cathode accepting electrons to reduce the composition comprising oxygen.

* * * * *